United States Patent
Lee et al.

(10) Patent No.: US 9,485,303 B2
(45) Date of Patent: Nov. 1, 2016

(54) CLUSTER SYSTEM BASED ON PARALLEL COMPUTING FRAMEWORK, AND HOST NODE, COMPUTING NODE AND METHOD FOR EXECUTING APPLICATION THEREIN

(71) Applicant: Seoul National University R&DB Foundation, Seoul (KR)

(72) Inventors: Jaejin Lee, Seoul (KR); Jungwon Kim, Seoul (KR)

(73) Assignee: Seoul National University R&DB Foundation, Seoul (KR)

(*) Notice: Subject to any disclaimer, the term of this patent is extended or adjusted under 35 U.S.C. 154(b) by 847 days.

(21) Appl. No.: 13/734,407

(22) Filed: Jan. 4, 2013

(65) Prior Publication Data
US 2013/0179486 A1 Jul. 11, 2013
US 2013/0346468 A2 Dec. 26, 2013

(30) Foreign Application Priority Data

Jan. 5, 1920 (KR) .................. 10-2012-0001690

(51) Int. Cl.
G06F 15/177 (2006.01)
H04L 29/08 (2006.01)
G06F 9/54 (2006.01)

(52) U.S. Cl.
CPC ............ *H04L 67/10* (2013.01); *G06F 9/545* (2013.01); *G06F 9/547* (2013.01)

(58) Field of Classification Search
USPC ................. 709/201, 226, 220, 223
See application file for complete search history.

(56) References Cited

U.S. PATENT DOCUMENTS

| | | | |
|---|---|---|---|
| 2011/0161495 A1* | 6/2011 | Ratering | G06F 9/5044 709/226 |
| 2011/0314453 A1* | 12/2011 | Tebeka | G06F 11/3404 717/130 |
| 2012/0069035 A1* | 3/2012 | Bourd | G06F 9/546 345/541 |
| 2013/0117305 A1* | 5/2013 | Varakin | G06F 9/5072 707/769 |
| 2013/0141443 A1* | 6/2013 | Schmit | G06F 8/41 345/505 |

OTHER PUBLICATIONS

KyuHo Lee, et al. "Comparing MPI and Clik in a Heterogeneous Cluster Computing Environment" The Institute of Electronics Engineers of Korea (IEEK) 2004 Summer Conference Thesis, vol. 27, No. 1 (4 pages, in Korean).

* cited by examiner

Primary Examiner — Philip B Tran

(57) ABSTRACT

A cluster system based on a parallel computing framework is provided, and the cluster system includes a host node configured to execute a host program for a parallel computing framework and a computing node configured to be connected to the host node and execute a kernel program for the parallel computing frame work.

7 Claims, 3 Drawing Sheets

CLUSTER SYSTEM BASED ON PARALLEL COMPUTING FRAMEWORK, AND HOST NODE, COMPUTING NODE AND METHOD FOR EXECUTING APPLICATION THEREIN

CROSS-REFERENCE TO RELATED APPLICATION

This application claims the benefit under 35 U.S.C. §119 (a) of Korean Patent Application No. 10-2012-0001690, filed on Jan. 5, 2012, the entire disclosure of which is incorporated herein by reference for all purposes.

BACKGROUND

1. Field

The following description relates to a technology of a parallel computing framework.

2. Description of the Related Art

Parallel computing refers to a form of computation in which many calculations are carried out simultaneously, operating on the principle that large problems can often be divided into smaller ones, which are then solved concurrently. There are several different forms of parallel computing: bit-level, instruction level, data, and task parallelism. Parallelism has been employed for many years, mainly in high-performance computing, but interest in it has grown lately due to the physical constraints preventing frequency scaling. As power consumption by computers has become a concern in recent years, parallel computing has become the dominant paradigm in computer architecture, mainly in the form of multicore processors.

A typical framework for parallel computers is OpenCL. OpenCL is a framework for writing programs that execute across heterogeneous platforms consisting of Central Processing Units (CPUs), Graphics Processing Units (GPUs), and other processors. OpenCL includes a language base on C99 for wiring kernels and Application Programming Interfaces (APIs) that are used to define and then control the platforms. OpenCL provides parallel computing using task-based and data-based parallelism.

Generally, OpenCL operates in a single node system, not in a cluster system which is nowadays widely used. Hence, if a user wants to write an application for OpenCL, the user has to use a message programming library to access a network. Such inconvenience makes it difficult to write an application. On top of that, even though the user adds a code for OpenCL on his own, OpenCL may not operate in a single node system.

SUMMARY

The following descriptions relate to a cluster system, a host node, a computing node, and a method for executing an application, all of which help a parallel computing framework to be executed efficiently.

In one general aspect of the present invention, a cluster system based on a parallel computing framework is provided, and the cluster system includes a host node configured to execute a host program for a parallel computing framework; and a computing node configured to be connected to the host node via a network and execute a kernel program for the parallel computing framework. The host node may generate a request message to request execution of a command related to the kernel program, and transmit the generated request message to the computing node via the network. The host node and the computing node may generate a network message and execute an application consisting of a host program and a kernel program while exchanging the generated network message.

In another general aspect of the present invention, a host node in a cluster system based on a parallel computing framework is provided, and the host node includes a host thread configured to execute a host program for a parallel computing framework and insert a command related to a kernel program in a command-queue which corresponds to a remote computing module capable of executing the kernel program for the parallel computing framework; and a command scheduler configured to select a command to be executed by scheduling the command-queue, generate a request message to request execution of the selected command and transmit the request message to a computing node via a network.

In another general aspect of the present invention, a computing node in a cluster system based on a parallel computing framework is provided, and the computing node includes one or more computing module; a command handler configured to receive a request message indicating a request for execution of a command related to a kernel program for a parallel computing framework from a remote host node which executes a host program, in response to the request message, generate a command object, and insert the generated command object in a ready-queue corresponding to the one or more computing modules; and a module thread configured to execute the command using the command object inserted in the ready-queue and the computing modules.

In another general aspect of the present invention, a method for executing an application in a cluster system based on a parallel computing network is provided, and the method includes, in a host node, inserting a command related to a kernel program for a parallel computing framework in a command-queue corresponding to a remote computing module which executes the kernel program; in the host node, selecting a command to be executed by scheduling the command-queue, generating a request message to request execution of the selected command, and transmitting the request message to a computing node; in a computing node, receiving the request message via a network, in response to the request message, generating a command object, and inserting the generated command object in a ready-queue corresponding to the one or more computing modules; in the computing node, executing the command using the command object inserted in the ready-queues and the computing module; and in the computing node, generating a completion message to notify that execution of the command has been completed, and transmitting the generated completion message to the host node via the network.

Other features and aspects will be apparent from the following detailed description, the drawings, and the claims.

Figure 1:
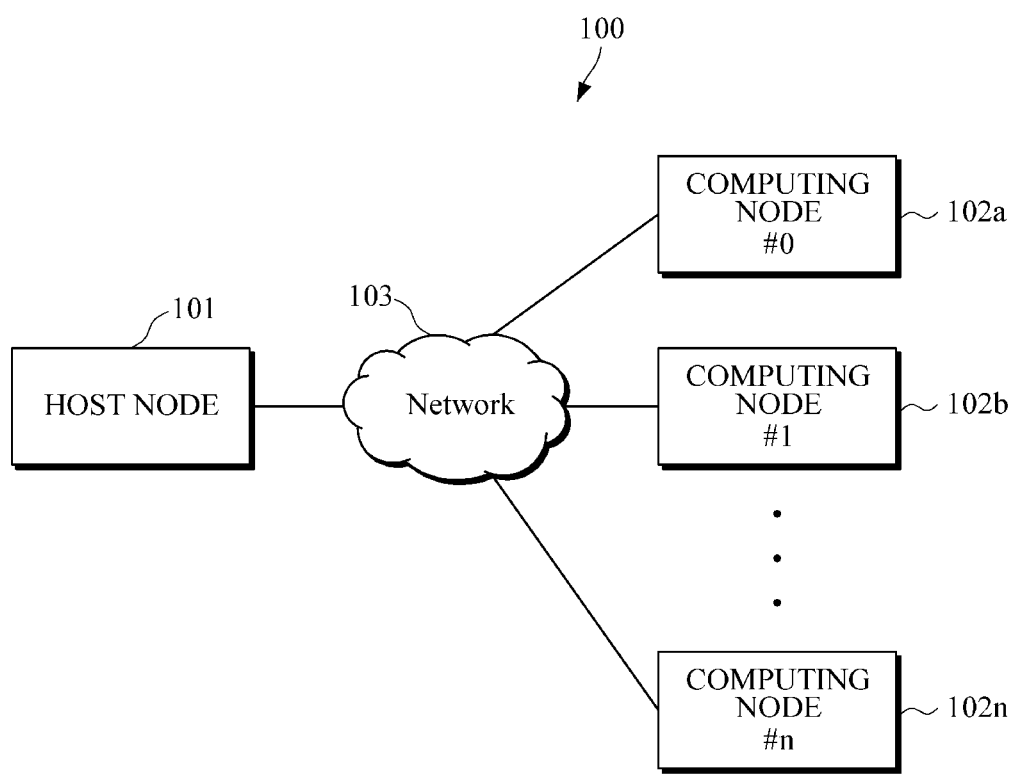
FIG. 1 is a diagram illustrating a configuration of a cluster system for a parallel computing framework according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

FIG. 1 is a diagram illustrating a configuration of a cluster system according to an exemplary embodiment of the present invention.

Referring to FIG. 1, a cluster system 100 according to an exemplary embodiment of the present invention includes a host node 101 and a plurality of computing nodes 102a, 102b, . . . , 102n. The host node 101 is connected to each of the computing nodes 102a, 102b, . . . , 102n via a network 103. The network 103 may be wired or wireless. The host node 101 and each of the computing nodes 102a, 102b, . . . , 102n are able to exchange information with each other using a network message. The network message may a LAN packet, an IPv4 packet, an IPv6 packet and the like.

The cluster system 100 consists of parallel computing frameworks. That is, a parallel computing framework according to an exemplary embodiment of the present invention is able to operate in the cluster system 100. The parallel computing framework for the cluster system 100 is may be OpenCL, OpenMP and CUDA.

An application for the parallel computing framework in the cluster system 100 may consist of a host program and a kernel program. The host program may manage the kernel program to be executed, and data computing may be processed in the kernel program. According to an exemplary embodiment of the present invention, the host program may be executed in the host node 101 and the kernel program may be executed in the computing nodes 102a, 102b, . . . , 102n.

The host node 101 executes a host program. The host node 101 may manage execution of the kernel program by executing a host program of an application written using a parallel computing programming tool. For example, the host node 101 is able to generate a request message to request execution of a command related to the kernel program, and transmit the generated request message to the computing nodes 102a, 102b, . . . , 102n via the network 103.

The computing nodes 102a, 102b, . . . , 102n execute the kernel program. In response to receiving the request message indicating a request for execution of the command, a computing node (for example, the computing node 102a) executes the command, generates a completion message to notify that execution of the command has been completed, and transmits the generated completion message to the host node 101.

Figure 2:
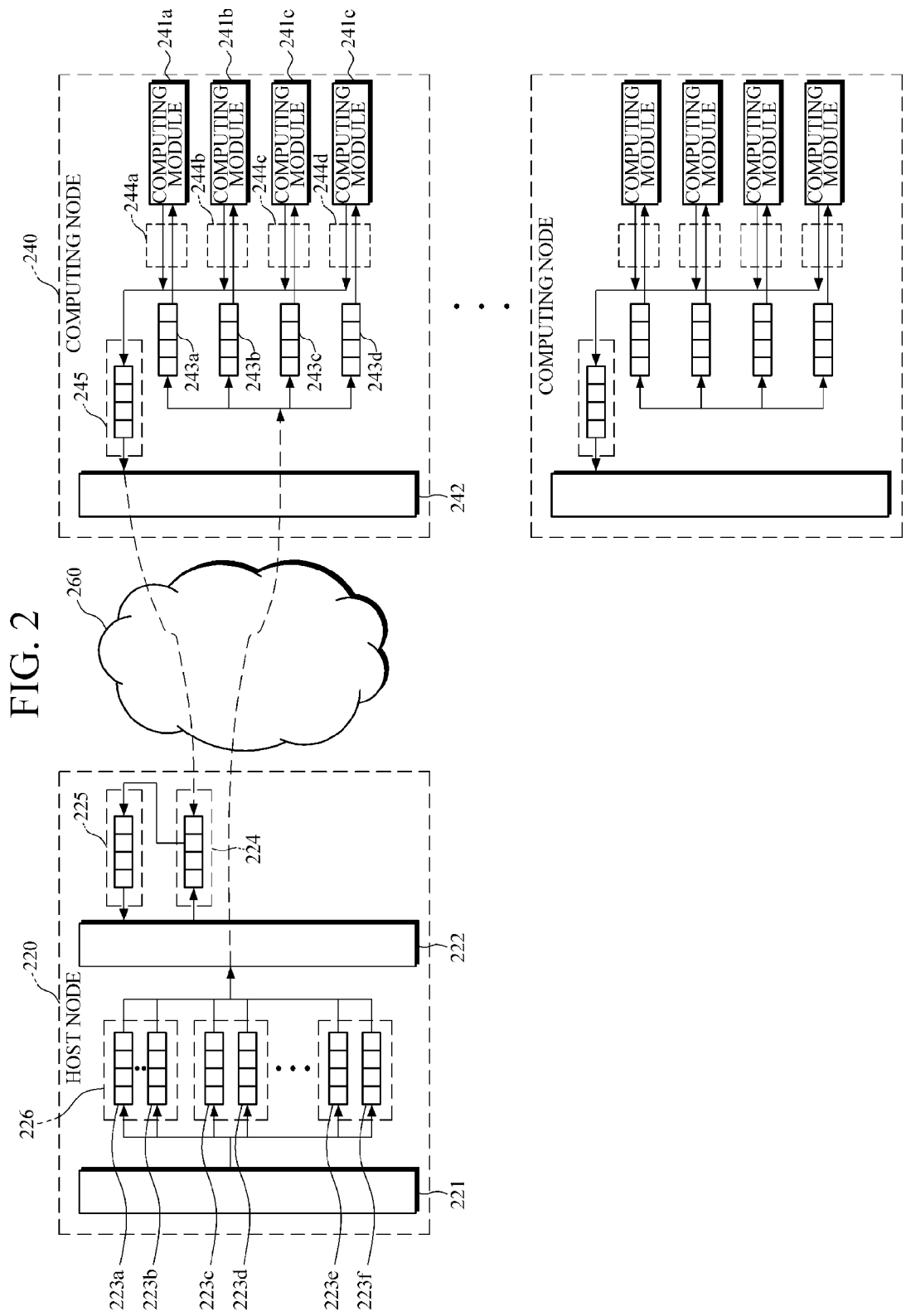
FIG. 2 is a diagram illustrating configurations of a host node and a computing node in a cluster system according to an exemplary embodiment of the present invention.

FIG. 2 is a diagram illustrating a host node and a computing node in a cluster system according to an exemplary embodiment of the present invention.

Referring to FIG. 2, a host node 220 may include a host thread 221, a command scheduler 222, command-queues 223a~223f, an issue-queue 224, and a completion-queue 225.

The host thread 221 executes a host program.

The host thread 221 inserts a command in the command-queue 223a-223f. The command-queues 223a~223f may respectively correspond to computing modules 241a, 241b, 241c and 241d of the computing node 240. For example, the first command-queue 223 included in the first command-queue group 226 is able to be mapped to the first computing module 241a included in the first computing node 240. A command may be one of various calculations related to a kernel program which is executed in the computing node 240. That is, the host thread 221 may determine the computing node 240 and a computing module (for example, the computing module 241) to execute a command, and insert the command in the determined computing node 240 and a command-queue (for example, the command-queue 223a) corresponding to the determined computing module 241a.

The command scheduler 222 schedules the command-queues 223a~223f. A scheduling algorithm may be round-robin and others according to an application purpose. For example, the command scheduler 222 is able to select a command to be executed according to a predetermined schedule algorithm and take out the selected command from the command-queues 223a~223f.

The command scheduler 222 generates a request message using the selected command. A request message may be a message in the form of packet which is transmitted via a network and used to request execution of the selected command. For example, the command scheduler 222 may generate packet data with an address field and a command description using the computing node 240, which is mapped to a command-queue (for example, the command-queue 223a) of the selected command, and a computing module (for example, the computing module 241a).

The command scheduler 222 transmits the generated request message to the computing node 240 via a network 260.

According to an exemplary embodiment of the present invention, the command scheduler 222 may store a command corresponding to the transmitted request message in the issue-queue 224, and wait for a response from the computing node 240. If the computing node 240 notifies that execution of the command has been completed, the command scheduler 222 may takes out the command stored in the issue-queue 224 and transfer the command to the completion-queue 225.

In addition, referring to FIG. 2, the computing node 240 may include a plurality of computing nodes 241a, 241b, 241c and 241d, a command handler 242, a plurality of ready-queues 243a, 243b, 242c and 243d, and a plurality of module threads 244a, 244b, 244c and 244d.

Each of the computing modules 241a, 241b, 241c and 241d may be a device to calculate and process data, including a CPU and a GPU.

The command handler 242 receives a request message from the host node 220 via the network 260.

In response to receiving the request message, the command handler 242 generates a command object and inserts the generated command object in the ready-queues 243a, 342b, 243c and 243d. The ready-queues 243a, 342b, 243c and 243d respectively correspond to the computing nodes 241a, 241b, 241c and 241d. Hence, if a command is determined to be executed in the first computing module 241a according to the request message, a command object may be inserted in the ready-queue 243a corresponding to the first computing module 241a.

The module threads 244a, 244b, 244c and 244d executes the command using the command object, which is inserted in the ready-queues 243a, 243b, 243c and 243d, and the computing modules 241a, 241b, 241c and 241d. For example, in the above example, the module thread 244a of the first computing module 241a may take out the command object and help the command to be processed in the first computing module based on the command object.

According to an exemplary embodiment of the present invention, if a command has been completely executed, the module threads 244a, 244b, 244c and 244d may insert the completed command in the completion-queue 245.

According to another exemplary embodiment of the present invention, using a command stored in the completion-queue 245, the command handler 242 may generate a completion message to notify that execution of the command has been completed, and then transmit the generated completion message to the host node 220 via the network 260.

Each element illustrated in FIG. 2 may be an electric circuit, hardware or an application program which is able to be executed in a predetermined processor. In addition, the elements are merely examples logically divided according to functions, and the functions of the elements may be divided by a different criteria used in FIG. 2. That is, two or more functional units may be integrated, or one or more functional units may take over a function of another functional unit FIG. 3 is a diagram illustrating a method for executing a cluster system according to an exemplary embodiment of the present invention.

Figure 3:
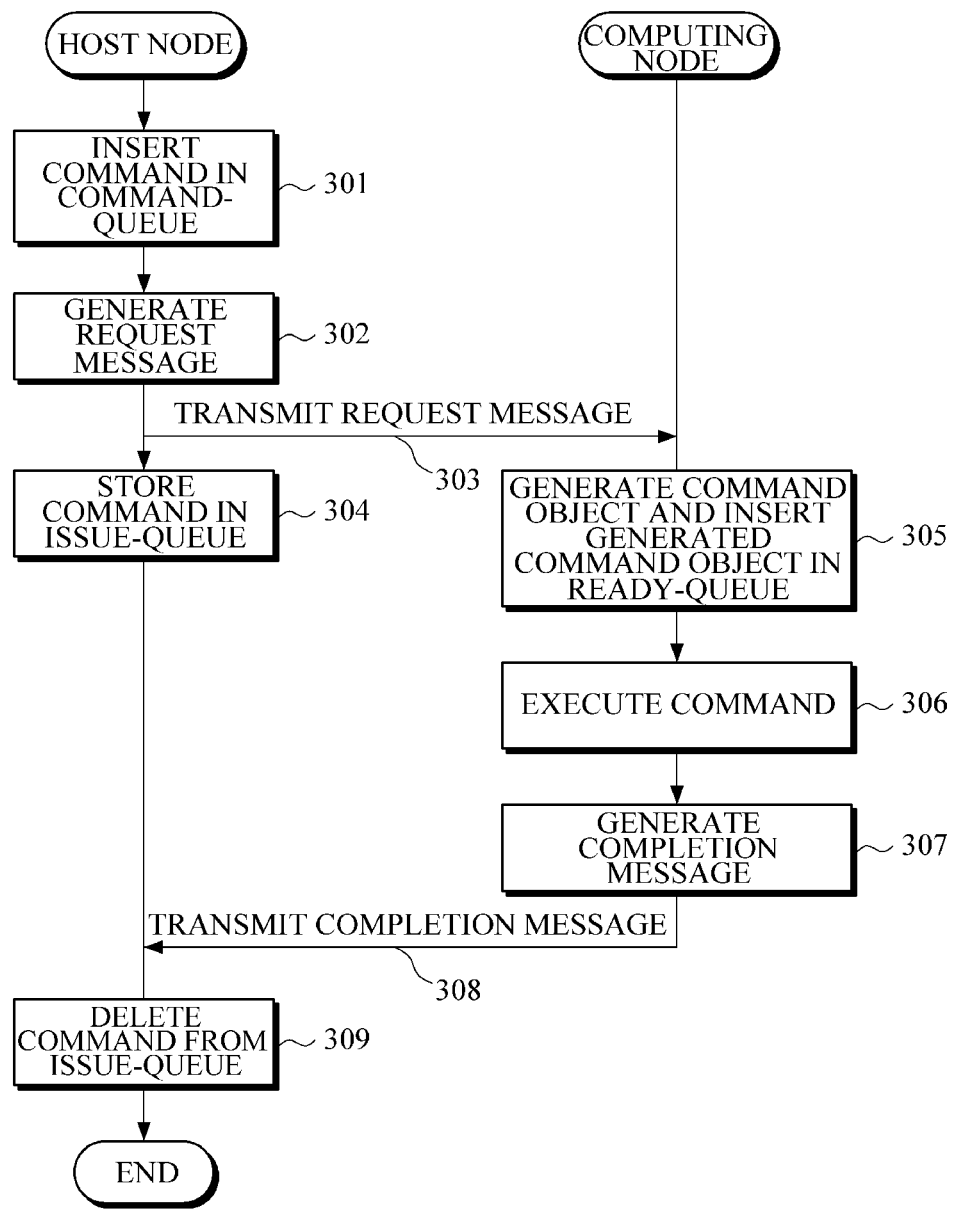
FIG. 3 is a diagram illustrating a method for executing an application for a parallel computing framework according to an exemplary embodiment of the present invention.

The method of FIG. 3 is able to be applied to execute an application which is for a parallel computing framework in a cluster system of FIGS. 1 and 2.

Referring to FIG. 3, in the method for executing an application according to an exemplary embodiment of the present invention, a host node inserts a command related to a kernel program for a parallel computing framework in a command-queue corresponding to a remote computing module which executes the kernel program in 301.

Next, the host node selects a command to be executed by scheduling the command-queue, and generates a request message to request execution of the selected command in 302.

Next, the host node transmits the request message to a computing node via a network in 303.

Meanwhile, the host node stores the command in the issue-queue in 304.

In response to receiving the request message, the computing node generates a command object and inserts the generated command object in a ready-queue corresponding to one or more computing modules in 305.

In addition, the computing node executes the command using the command object inserted in the ready-queue and the computing module 306.

When execution of the command has been completed, the computing node generates a completion message to notify execution of the command has been completed in 307, and transmits the generated completion message to the host node via the network in 308.

In response to receiving the completion message, the host node deletes the command stored in the issue-queue in 309. For example, the host node is able to transfer the command from the issue-queue to a completion-queue.

As described in the above exemplary embodiments of the present invention, an application of a parallel computing programming model is executed while a host node and a computing node in a cluster system execute are exchanging messages with each other. Due to this feature, a user does not need to add a code, such as Message Passing Interface (MPI), to an application on his own, so that the number of application bugs may reduce, the productivity of a programmer may improve, and the portability of a parallel computing framework may be enhanced.

Meanwhile, the exemplary embodiments of the present invention may be realized using computer-readable codes in a computer-readable recording medium. The computer-readable recording medium includes all types of recording devices which stores computer-system readable data.

Examples of the computer-readable recording medium includes a Read Only Memory (ROM), a Random Access Memory (RAM), a CD-ROM, a magnetic tape, a floppy disk and an optical data storage device, and the computer readable recording medium may be realized in a carrier wave form (for example, transition via the Internet). In addition, the computer-readable recording medium is distributed in a computer system connected via a network so that computer-readable codes are stored and executed in an distributed manner. In addition, functional programs, codes and code segments used to embody the present invention may be easily anticipated by programmers in the technical field of the present invention.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cluster system based on a parallel computing framework, the cluster system comprising:
 a host node configured to execute a host program for a parallel computing framework; and
 a computing node configured to be connected to the host node via a network and execute a kernel program for the parallel computing framework,
 wherein the host node comprising a processor configured to execute a host thread,
 wherein the host thread is configured to execute a host program for a parallel computing framework and to insert a command related to a kernel program in a command-queue which corresponds to a remote computing module capable of executing the kernel program or the parallel computing framework and a command scheduler configured to select a command to be executed by scheduling the command-queue, generate a request message to request execution of the selected command and transmit the request message to a computing node via a network,
 wherein the command scheduler, in response to receiving the request message, stores the selected command in an issue-queue, and, in response to receiving from the computing mode a completion message to notify that execution of the command has been completed, deletes the command stored in the issue-queue, and
 wherein the computing node comprises one or more computing modules to execute the kernel program.

2. The cluster system of claim 1, wherein the host node generates a request message to request execution of a command related to the kernel program, and transmits the generated request message to the computing node via the network.

3. The cluster system of claim 2, wherein the computing node execute the command in response to the request message, generates a completion message to notify execution of the command is completed, and transmit the generated completion message to the host node via the network.

4. The cluster system of claim 1, wherein the host node comprises one or more command-queues respectively corresponding to the one or more computing modules.

5. The host node of claim 1, wherein, in the case of where a number of computing modules are provided, one or more command-queues are formed corresponding to the number of computing modules.

6. The computing node of claim 1, the computing node further comprising:

a command handler processor configured to receive a request message indicating a request for execution of a command related to a kernel program for a parallel computing framework from a remote host node which executes a host program, in response to the request message, generate a command object, and insert the generated command object in a ready-queue corresponding to the computing modules; and a module thread processor configured to execute the command using the command object inserted in the ready-queue and the computing modules.

7. The computing node of claim 6, wherein, when execution of the command has been completed, the command handler generates a completion message to notify that execution of the command has been completed, and transmits the generated completion message to the remote host node via the network.

* * * * *